Feb. 7, 1961 G. B. BRINGMANN 2,970,385
EDUCATIONAL DEVICE AND PROBE THEREFOR
Filed April 8, 1958
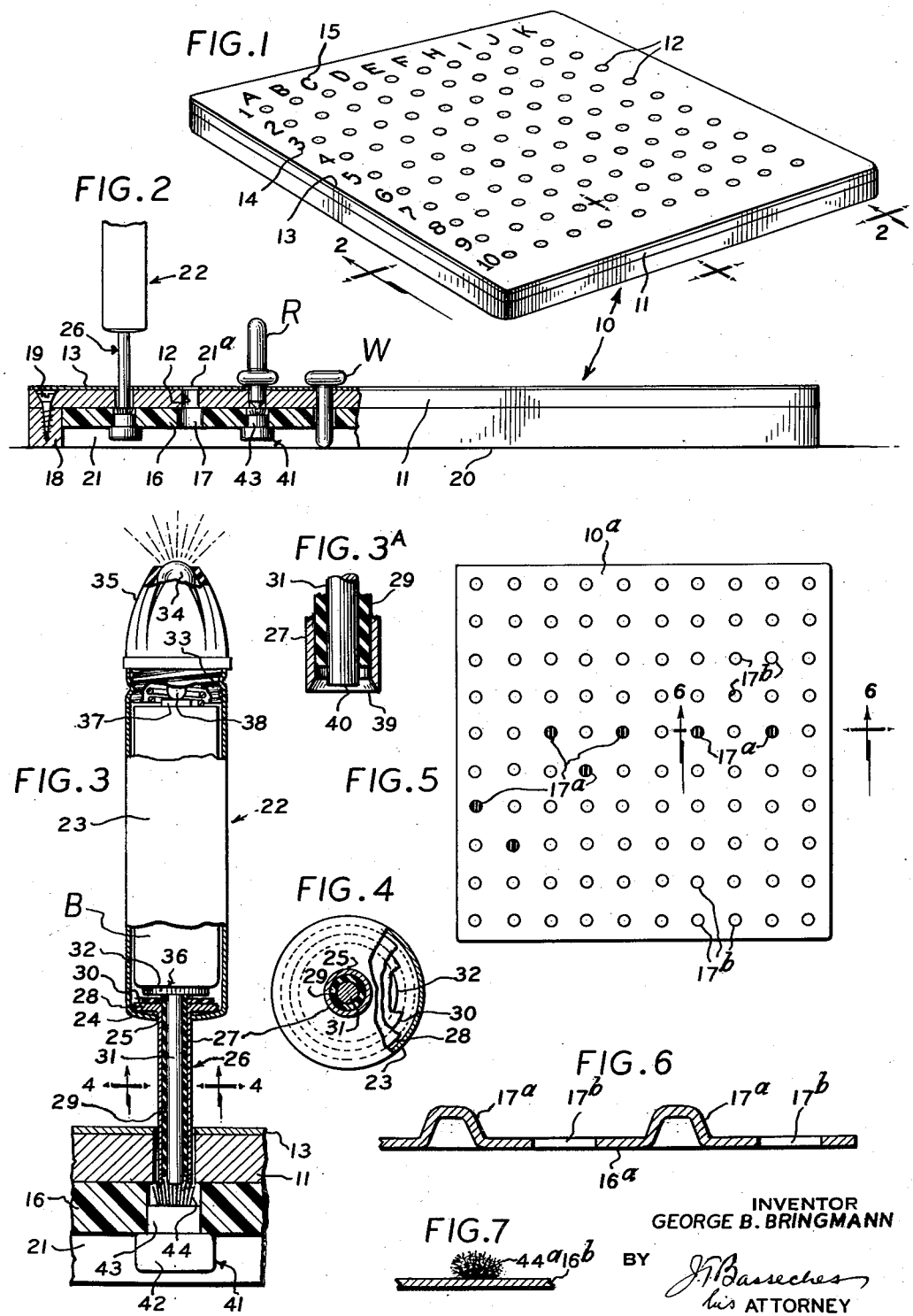
INVENTOR
GEORGE B. BRINGMANN
BY
*J. B. Basseches*
his ATTORNEY

United States Patent Office 2,970,385
Patented Feb. 7, 1961

2,970,385

EDUCATIONAL DEVICE AND PROBE THEREFOR

George B. Bringmann, 3355 Decatur Ave., Bronx, N.Y.

Filed Apr. 8, 1958, Ser. No. 727,214

3 Claims. (Cl. 35—9)

This invention relates to an educational device; more particularly to an educational device having signalling means; and still more particularly to a signalling means for use therewith.

Known to me are educational devices in the form of quiz games in which multiple answers are suggested and which include a complex wiring system and contacting probe so that a circuit may be closed upon the probe being brought into contact with one of a selected number of possible answers. Such constructions are costly and are limited in nature by reason thereof to a comparatively simple number of organized questions and answers, as well as by the fact that they quickly become disorganized due to failure of contacts in the wiring assembly.

Known to me also are quiz games or question forms with multiple answer possibilities, in which a self-contained flashing signal is made possible by the application of surface coatings having selective conductivity. Such devices have only temporary utility and supply no means of permanently scoring the results of the quiz on the devices themselves.

Accordingly, it is an object of this invention to provide an educational device in the nature of a game board, in which a panel element capable of carrying graphic representations has formed thereon a plurality of sockets, one face of the panel forming a concealing entrance to the opposite face of the panel through the sockets, and the opposite face of the panel carrying removable means selectively to close predetermined sockets by electrical contacting means whereby, in projecting a probe through the front face toward the rear face of the panel, a flashing signal will be obtained.

More particularly, my invention resides in the provision of an educational device including a panel provided with a multiplicity of sockets through which removably positioned components may be combined, predeterminedly to identify the sockets with removable expedients capable of closing the circuit, of a probe projectible into said sockets.

Still more particularly, it is an object of my invention to provide a panel forming a portion of an educational device in which a plurality of sockets are of a depth to conceal the nature of the surface to the opposite side, whereby variable assemblies of contacting material may be applied to the rear face of the panel, providing contacting means for closing the electrical circuit of a probe having flashing signalling means, thereby to provide a wide variety of assemblies with which the panel may be employed.

Still more particularly, it is an object of my invention to provide for use with a panel having a plurality of sockets, as in an educational device or otherwise, a probing device whereby a flashing signal may be secured in encountering a conducting element, whereby the presence of a conducting member may be detected within cavities or sockets which are visually inaccessible by reason of their depth or the constricted nature of the apertures.

To attain these objects and such further objects as may appear herein or be hereinafter pointed out, I make reference to the accompanying drawings, forming a part hereof, in which—

Figure 1 is a perspective view of an assembly in accordance with my invention;

Figure 2 is a magnified fragmentary section taken on the line 2—2 of Figure 1;

Figure 3 is a still further magnified fragmentary section showing a probing assembly in use in accordance with my invention;

Figure 3a is a still further magnified fragmentary section of the probe end;

Figure 4 is a section taken on the line 4—4 of Figure 3;

Figure 5 is a plan view showing another embodiment of my invention;

Figure 6 is a magnified fragmentary section taken on the line 6—6 of Figure 5;

Figure 7 is a fragmentary section of a still further embodiment of my invention.

I now make reference to the drawing, wherein my invention, in one embodiment thereof, is illustrated in the form of a game board 10 having a body panel 11 formed with a plurality of transverse perforations or sockets 12, to one side of which panel there is a sheet 13 carrying indicia 14 and 15, having a predetermined relation to each of the sockets 12. Rearwardly of the panel 11, there is under-laid or laminated thereto the insulation panel 16 having apertures 17 coincident with the socket portions 12 and open at the rear face. A border support or frame 18, affixed by suitable fastening means 19, may space the panel 16 from a supporting surface 20, thereby forming an air gap 21 between the supporting surface 20 and the panel 16.

Each of the socket means formed by the aligned apertures 12 and 17 has its mouth portion 21a with relation to the socket portion arranged visually to conceal the bottom of the apertures or sockets. Accordingly, mere visual inspection of the board when it is on a supporting surface 20 will not discernibly indicate whether the socket is open or closed or contains any blocking material, as will appear herebelow.

To exemplify one use to be made of the game board, I provide a probing signal device 22. In this construction, a case 23 of generally cylindrical shape recognized as a pocket type or pencil type of flashlight, has its bottom portion 24 formed with a central opening 25 through which extends a probing shaft 26 comprising a conductor tube or sleeve 27, having a flange 28 resting on the inside surface of the bottom 24. The flange 28 serves to make electrical contact with the casing 23.

Within the tubular member 27 there is extended an insulator sleeve or tube 29, having an insulating washer 30. A needle element 31 is concentrically positioned in the sleeve 29 and is coupled within the casing in a flange 32 of conducting material. The flange 28 of the conductor sleeve 27 is arranged to serve to contact the casing 23 electrically and, in turn, extends to the screw portion 33 of the bulb 34 held in relation to the casing 23 by the non-conductor cap 35.

Within the casing, the battery B has its base 36 in contact with the flange 32 and its upper terminal 37 in contact with the central contact 38 of the bulb 34. It will be observed that in this manner, the bulb 34 is in an open circuit unless closed by bridging the gap between the termini 39 and 40 of the conductor sleeve 27 and the needle element 31. The entire composite of sleeve 27, needle element 31 forming a sensing probe and insulating sleeve 29 need be no more than approximately one eighth inch, thereby to fit within the mouth 21a of the sockets of the board previously described.

With the dimensions of the sockets as indicated, it will be apparent that with a depth of three eighths to one half inch, there is enough shielding of the bottom of each of the sockets to obscure from view the nature of the bottom of the socket.

I will now refer to one form of use of my assembly. For this purpose I may provide a plurality of plugs 41 having a finger flange portion 42 (see Figure 3) and a neck portion 43 arranged frictionally to fit and be held within the socket portion 17 on the rear face of the panel 16. The neck portion 43 may be formed with a cup to support a conductor 44, such as a tuft of copper or brass bristles, or a small ball of steel wool. The plugs 41 may, therefore, be positioned at predetermined locations on the panel, the presence of these plugs being obscured to the eye. Detection of their presence may be obtained by the probing device 22 shown in Figure 3 when the probing shaft 26 is projected so that the termini 39 and 40 contact the conductor 44. On such occasion, the shorting closes the battery circuit, illuminating the bulb 34 as will be understood, indicating the presence of the conductor closure for the socket 12.

With such an assembly, the panel 13 may have some graphic matter printed thereon at the indicia portion 14 and 15, such as a series of true or false questions, with a selection of one of a plurality of answers. The conducting element is predeterminedly positioned adjacent the bottom of the cavity or socket related to the correct answer, so that a flashing signal will be given when the probe is inserted therein.

Another illustrative manner of use of the assembly includes the provision of markers R and W, which may be of contrasting colors. As those playing the game indicate their answer, the location of the probe aperture may be marked by either a marker R, indicating a correct answer, or a marker W, indicating a wrong answer. Two or more players may therefore compete and score their results by totaling the number of correct or incorrect plugs they may have on the board, in responding to the series of questions.

Other games may be arranged and will be readily apparent from the illustrations given, such as by having a plurality of players, each player having control of his own board and keeping score on his board by marking the sockets after probing to select the location of the predetermined socket corresponding to what he may believe to be the proper answer.

Spacial arrangement of the plugs may also be used to play the game known as "Battleship" where, below the surface of the panel various plugs may be arranged, the problem being to outguess the opponent as to the location of the plugs which correspond to vessels, battleships or the like.

Another form of use of the panel is illustrated in Figure 5 wherein the panel 10a may be used to simulate the relative position of the heavenly bodies. In this construction a removably located rear panel 16a has protuberances 17a formed or pressed-up thereon to fit within selected sockets 12 on the rear surface. Other portions corresponding in position to the sockets 12 are left flat. The panel 16a may be made of metallic foil, such as aluminum or tin, having perforations 17b corresponding to the sockets 12 in predetermined locations. The panel 16a may carry the protuberances 17a, preferably conically shaped, in a spacial position to outline, for example, the location of the Little Dipper with respect to a fixed point, such as the North Star. In this manner, two contestants may compete in an attempt to outline the Little Dipper on the board by probing apertures on the panel 10a, in an endeavor to find the correct spacial position of the stars comprising the Little Dipper.

While I have shown and described in Figure 6 a rear panel 16a made of metal foil such as aluminum, formed with embossing 17a of a general contour which may be projected into the apertures 17 for contact by the termini 39, 40 of the probe to produce a signal, it will be understood that a non-conductor panel may be employed. For this purpose I show in Figure 7 a fragment of a panel 16b. This panel may carry a small ball 44a made of steel wool or like conducting material. When the panel 16b is aligned beneath a predetermined aperture 17 of the panel shown in Figures 1 and 2, upon being contacted by the probe 26 in engagement with the termini 39, 40, a flashing signal will be secured as described in connection with the prior embodiments. It will be understood that the game board may thereby be altered simply by arranging any non-conducting materials, such as paper or cardboard, to support the tiny ball of steel wool adjacent a predetermined socket 17 in accordance with some predetermined plan.

Numerous other forms of educational contests will readily suggest themselves, the foregoing games being merely illustrative, and that my invention is to be construed broadly within the scope of the appended claims.

Having thus described my invention and illustrated its use, what I claim as new and desire to secure by Letters Patent is—

1. An electric educational device comprising an electric signal means, a sensing probe operatively connected to said signal, a panel member having a front face, a rear face and an insulating portion, a plurality of sockets in said panel member, each of said sockets having a mouth portion at the front face of said panel member and being spacially extended in a predetermined arrangement and of a depth effectively to conceal visually portions of the sockets which lie inwardly of the mouth portion, and deformable conductor means arranged to be positionally spaced from the mouth portion of said sockets upon the rear face of said panel member in a predeterminedly selected number of said sockets, said sensing probe comprising an extended couple of separately insulated conductors whose termini are adapted for insertion within said sockets from the mouth portion to the conductor means, whereby when said sensing probe is inserted in any of said sockets having said conductor means, to come into contact with said conductor means, said signal means is energized.

2. A device in accordance with claim 1 wherein said conductor means comprise a plurality of plugs frictionally retainable within said sockets on the rear face of said panel member for carrying said deformable conductor means to contact with the sensing probes.

3. For use with a device in accordance with claim 1 wherein said signal means comprises a flash light case of the pencil light type having light means and electrical energizing means therefor, the sensing probe being in opposed position to said light means extending from said case, said sensing probe being coupled to said light and energizing means at one end and comprising a conductor sleeve within which is concentrically positioned a conductor needle insulated within said sleeve, said sleeve and needle having their termini of a size to extend within the mouth of said socket to pass to said conductor means, said conductor means thereby bridging the said termini and energizing the signal means.

References Cited in the file of this patent
UNITED STATES PATENTS

| | | |
|---|---|---|
| 2,197,306 | Ingraham | Apr. 16, 1940 |
| 2,512,820 | Bader | June 27, 1950 |
| 2,546,666 | Fleischer | Mar. 27, 1951 |
| 2,628,101 | Prentice | Feb. 10, 1953 |